March 5, 1935. W. C. WAGNER 1,993,313
PENALIZING METER
Filed March 9, 1933 2 Sheets-Sheet 2
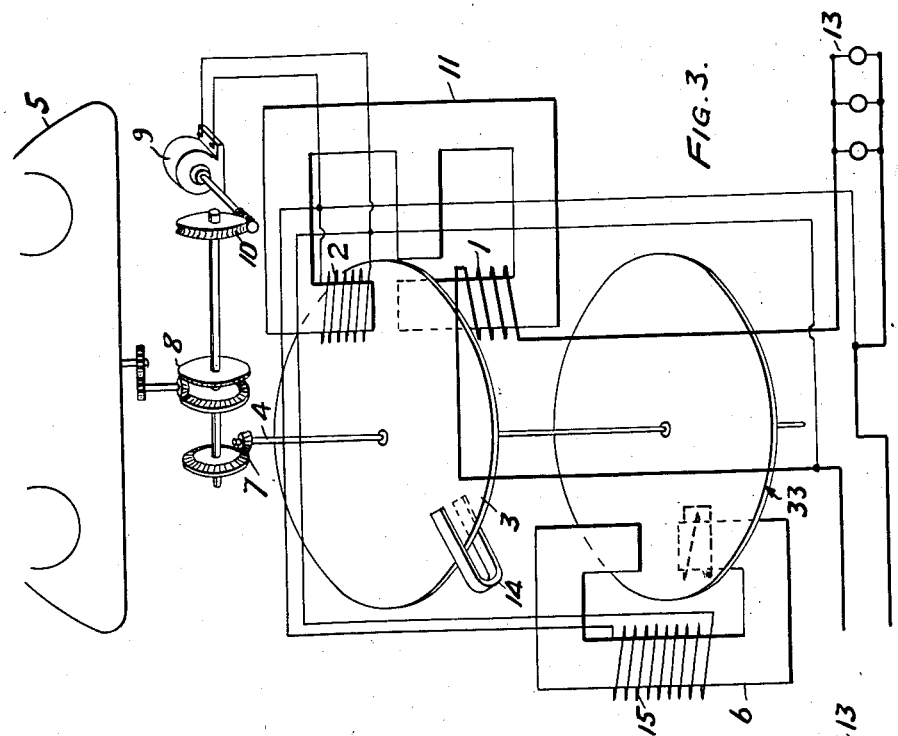
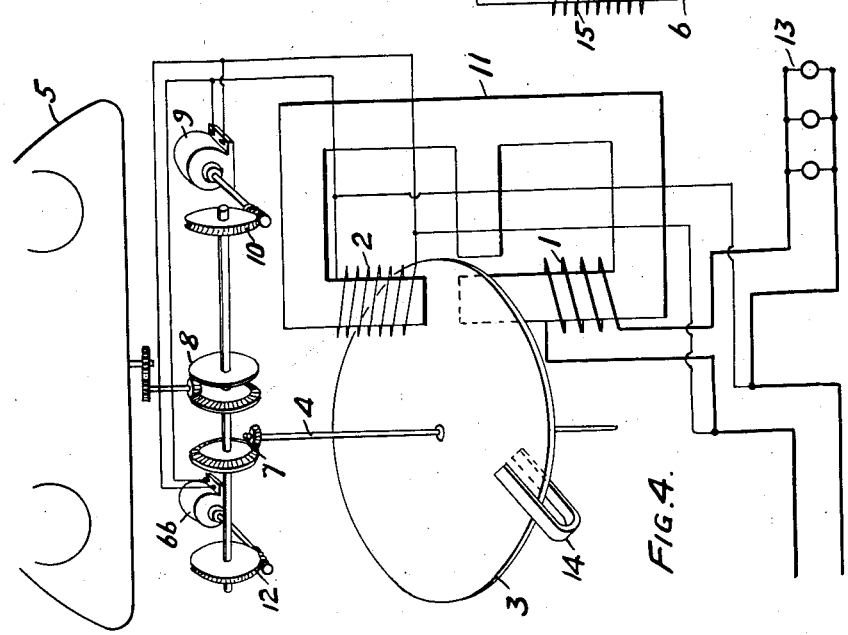
INVENTOR
Walter C. Wagner
BY
Augustus B. Stoughton
ATTORNEY.
WITNESS:
Robt R Mitchel Patented Mar. 5, 1935

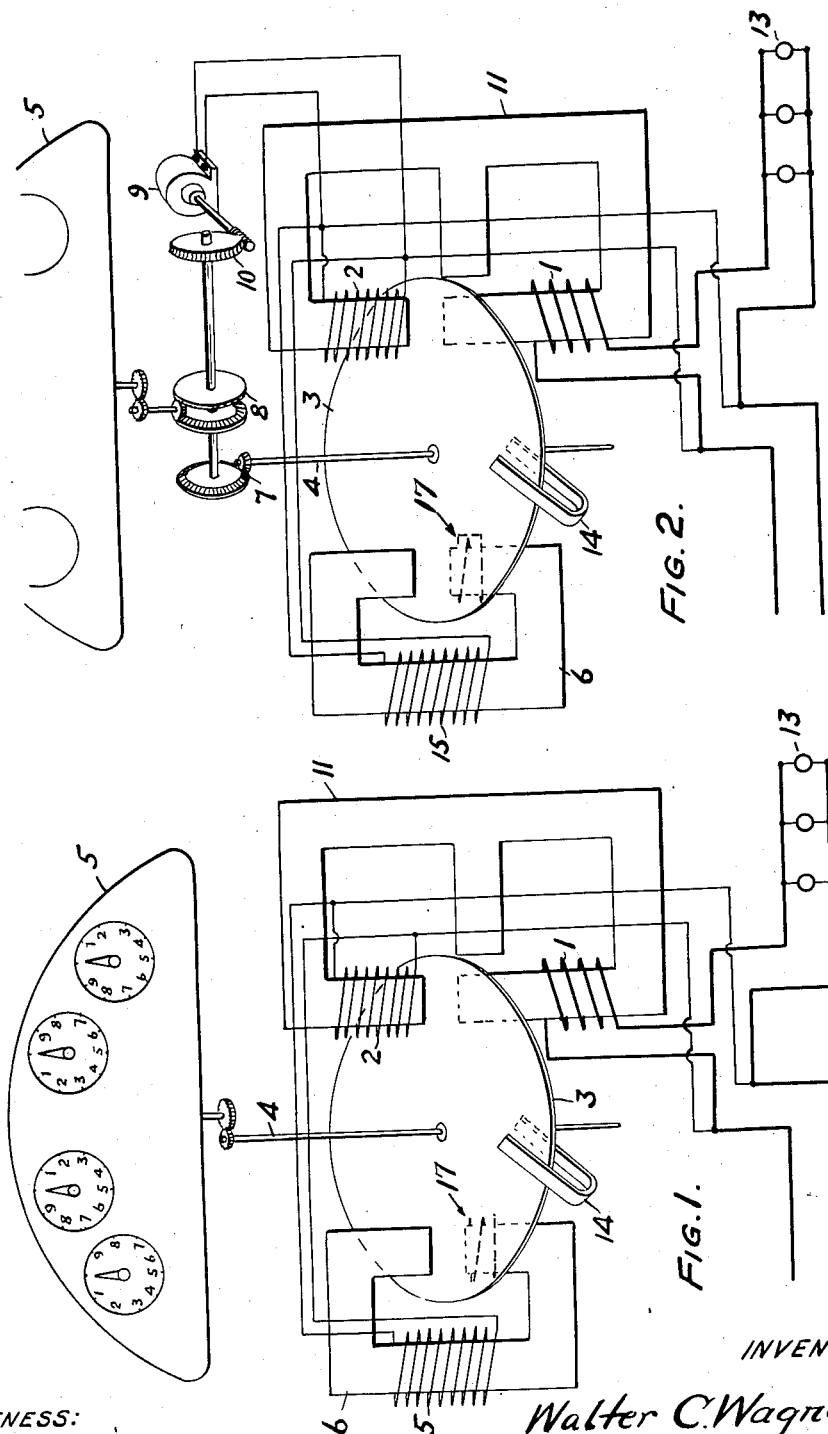

1,993,313

UNITED STATES PATENT OFFICE 1,993,313

PENALIZING METER

Walter C. Wagner, Ardmore, Pa.

Application March 9, 1933, Serial No. 660,091

6 Claims. (Cl. 171—34)

This invention is embodied in a meter which will show increased registration whenever the rotating element of the meter is stopped mechanically while the metering element is connected to the supply lines. The meter has been developed as a means of detecting and discouraging tampering, of which the method most generally followed is that of boring a hole in the cover and stopping the disk. In a meter of this invention the stopping of the disk automatically causes registration on the register at a predetermined rate.

At the end of the following description the invention will be claimed, but it will first be described in connection with the accompanying drawings, forming part hereof, and in which, Figure 1 is a diagrammatic and schematic view illustrating so much and such parts of a conventional watthour meter as are necessary or useful for a description of the invention, and Figs. 2, 3 and 4 are similar views illustrating modifications.

Figure 1 represents a conventional watthour meter to which has been added an element which provides a constant torque on the movable disk. The watthour meter element consists of current coil 1 and potential coil 2, mounted on a suitable core 11, in operative relation to disk 3 which is mounted on shaft 4. Shaft 4 actuates register 5 and this portion of the assembly is entirely similar to the construction of standard watthour meters. The constant torque element consists of a coil 15 which, with dephasing coil 17, is mounted on a suitable core 6, also in operative relation to disk 3. The rotation of disk 3 is retarded as to speed by a magnet 14, which serves as a means of adjustment either by changing its position in relation to the disk or by a magnetic shunt device not shown because too well understood to require illustration or detail description. The drawings show only the principles involved, and do not include many parts of standard watthour meters which are not inherently a part of this invention, and for which no originality is claimed. Some of these parts are the light load adjustment, the lag adjustment, the bearings, the detailed register gearing, and in polyphase meters the balancing adjustments. Cores 6 and 11 are shown in their simplest form but the invention includes any suitable shapes for these electromagnets in the combination of a metering element with a constant speed element.

In operation the constant speed element rotates or tends to rotate the disk at a predetermined speed which is chosen to produce a predetermined registration in kilowatt-hours on register 5. The speed of the constant-speed element is advantageously chosen so as to be higher than that which would be produced in the reverse direction by any load which is likely to be placed on the service. The metering element is arranged so that its torque opposes that of the constant speed element, and thus a retarding torque will be produced which will be proportional to the energy consumption of load 13. In employing this elementary form of meter, the actual difference in registration which would normally be used in billing the customer is subtracted from the predetermined registration which would occur when the metering element carries no load during the period. Hence the difference between the actual reading and the known no-load value would indicate the kilowatt-hours used during the period under consideration.

If at any time during the period the rotation of the disk be stopped, the apparent registration shown on register 5 will be less than under normal conditions, but since the register reading is subtracted from a predetermined larger value, the apparent billing value will be increased.

Figure 2 shows a more advanced design for a penalizing meter in which the same principles are employed for the metering elements, but register 5 in this case gives automatically the kilowatt-hours consumption as in the standard watthour meter. This is accomplished by using a differential gear in register 5 together with a timing motor 9. Motor 9 operates register 5 through suitable gearing 10, and the differential gear 8. The combination of meter element and constant-speed element operates the register through suitable gearing 7 and differential gears 8. The direction of rotation of the various parts is arranged so that constant speed elements 6—15 and motor 9 produce or tend to produce equal speeds in opposite directions at the differential gear, thereby resulting in zero registration on register 5. The torque produced by the metering element on the disk 3 is opposite in direction to that of the constant-speed elements 6—15 and hence the speed of gear 7, and the corresponding side of differential gears 8 is reduced in proportion to load 13, due to the torque of metering elements 1, 2 and 11. Since the registration of register 5 is proportional to the difference in speed between the two sides of differential gears 8, the reading of register 5 may be directly in kilowatt-hours. If the disk 3 is stopped the motor 9 alone operates the register 5 and the apparent registration shown on the register 5 will be greater than under normal conditions.

Figure 3 shows a meter operating on the same principles as in Figure 2 and is an example of an alternative arrangement or modification. The constant speed element here actuates a separate disk from that used for the metering element, and coil 15 and core 6 co-act with disk 33 which is mounted on the same shaft with the metering element.

Figure 4 shows another alternative arrangement or modification and differs from Figures 2 and 3 in that the constant speed element 6—15, which was shown to act directly on a meter disk, has been replaced by a motor of suitable torque characteristics. Motor 66 is connected with differential gears 8 through suitable gearing 12 and rotates also the meter disk through gearing 7. The torque of meter element 1, 2 and 11 is opposite in direction to that of motor 66, and also opposite to that of motor 9.

Many variations or modifications of the arrangements shown are possible and this invention includes all methods of construction which employ the principles involved.

It will be obvious that my invention consists of a combination of elements and is not limited to mere details of these elements and the arrangement thereof, since those skilled in the art will readily understand that each of the elements of the novel combinations shown and claimed has equivalents which may be substituted therefor. I therefore do not intend to be limited in the practice of my invention save as the scope of the prior art and of the attached claims may require.

I claim:

1. In an integrating meter the combination of a measuring element with an element of substantially constant speed arranged so that their torques will be differential, a second means of substantially constant speed mounted to co-act with said elements and whose direction of rotation opposes that of the first element of substantially constant speed, and a register provided with differential gearing and arranged to record the difference between the integrated rotation of said elements.

2. The combination, in an integrating meter, of a metering element, a substantially constant-speed motor which drives the disk of said metering element, the torque of the metering element opposing the torque of the substantially constant-speed motor, a register having a differential gear driven by the constant-speed motor, and a second substantially constant-speed motor arranged to rotate in the reverse direction of the first named substantially constant-speed motor and connected with the differential gear and register and which co-act to produce a differential registration on said register.

3. In a meter, the combination of, a register, a differential gear arrangement for driving said register, a substantially constant speed motor connected to drive one side of said differential gear arrangement at substantially constant speed, a meter connected to measure a quantity which is to be ascertained and to drive said side of said differential gear arrangement in the opposite direction to said substantially constant speed motor, and a second substantially constant speed motor connected to drive the other side of said differential gear arrangement in the opposite direction to said first-mentioned substantially constant speed motor.

4. In an electric watthour meter comprising current and voltage coils in operative relation to a core and a disk in operative relation to said coils and said core and mounted on a shaft geared to one driving member of a differential gear, an additional coil and a second core mounted in operative relation to said disk and shaft and arranged to drive said disk and shaft in the opposite direction to that of said current and voltage coils; a substantially constant speed motor, gearing and a shaft carrying a second driving member of a differential gear, and means for indicating the difference in the number of revolutions of said driving members of said differential gear.

5. In an electric watthour meter comprising current and voltage coils in operative relation to a core and a disk in operative relation to said coils and said core and mounted on a shaft geared to the driving member of one side of a differential gear; coils and a second core mounted in operative relation to a second disk mounted on said shaft; a substantially constant-speed motor, gearing and a shaft carrying a second driving member of a differential gear, and means for indicating the difference in the number of revolutions of said driving members of said differential gear.

6. In an electric watthour meter, a measuring element geared to a driving member of a differential gear, a substantially constant speed motor geared to said driving member of said differential gear and operating in the opposite direction to the torque of said measuring element; a second substantially constant speed motor geared to the second driving member of said differential gear and arranged to operate in the opposite direction to said first-mentioned substantially constant speed motor, and means for indicating the difference between the revolutions of said driving members of said differential gear.

WALTER C. WAGNER.